C. H. NEWTON.
SHOCK ABSORBER.
APPLICATION FILED OCT. 27, 1906.
924,817.
Patented June 15, 1909.
2 SHEETS—SHEET 1.
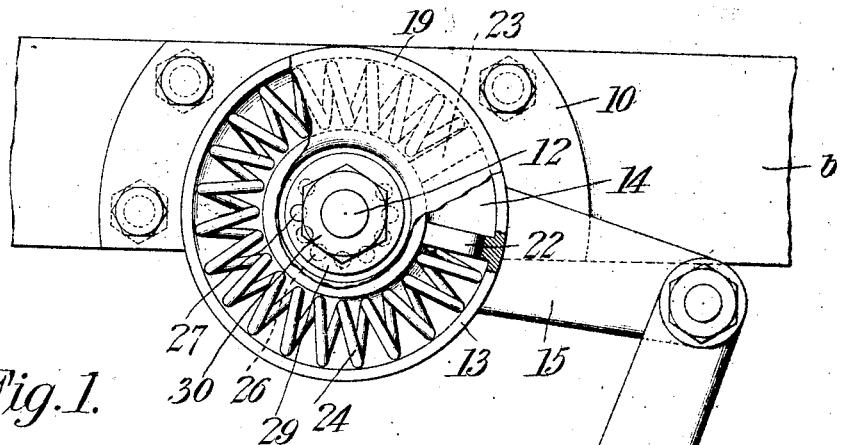
Fig.1.
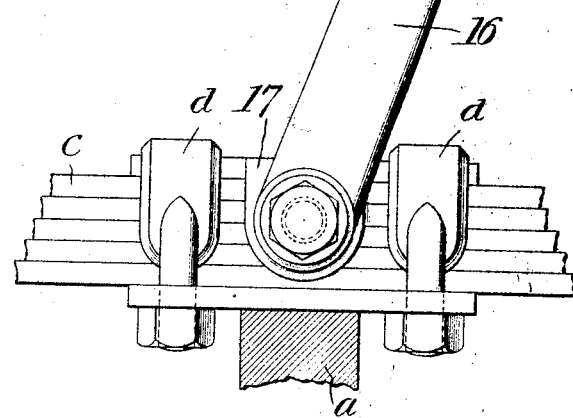
Fig.2.
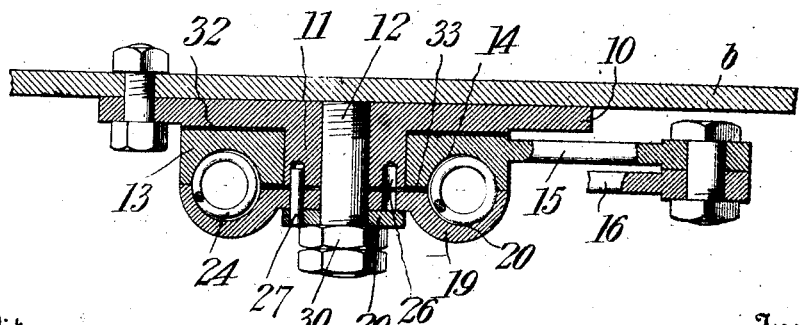
Witnesses
Fenton S. Belt
Grace P. Brereton
Inventor
Charles H. Newton
By Sturtevant & Mason
Attorneys.

C. H. NEWTON.
SHOCK ABSORBER.
APPLICATION FILED OCT. 27, 1906.

924,817.

Patented June 15, 1909.
2 SHEETS—SHEET 2.

Witnesses
Fenton S. Belt
Grace P. Brereton

Inventor
Charles H. Newton
By Sturtevant & Mason
Attorneys

UNITED STATES PATENT OFFICE.

CHARLES HOLLISTER NEWTON, OF TORRINGTON, CONNECTICUT, ASSIGNOR TO THE STANDARD COMPANY, OF TORRINGTON, CONNECTICUT, A CORPORATION OF MAINE.

SHOCK-ABSORBER.

No. 924,817.     Specification of Letters Patent.     Patented June 15, 1909.

Application filed October 27, 1906. Serial No. 340,914.

*To all whom it may concern:*

Be it known that I, CHARLES HOLLISTER NEWTON, a citizen of the United States, residing at Torrington, in the county of Litchfield, State of Connecticut, have invented certain new and useful Improvements in Shock-Absorbers, of which the following is a description, reference being had to the accompanying drawings, and to the letters and figures of reference marked thereon.

The principal object of the present invention, is to provide an improved means for preventing or minimizing the jolting or vibratory movement of automobiles, and other vehicle bodies while traveling over rough or uneven roads.

A further object of the invention is to provide an anti-vibration or shock absorbing means, which will act during downward movement of the frame or vehicle body to offer uniform resistance, and, on the upward movement, to offer gradually increased resistance in order to more effectually check the vibration.

With these and other objects in view, the invention consists in the matters hereinafter described, and referred to in the appended claims.

Figure 3:
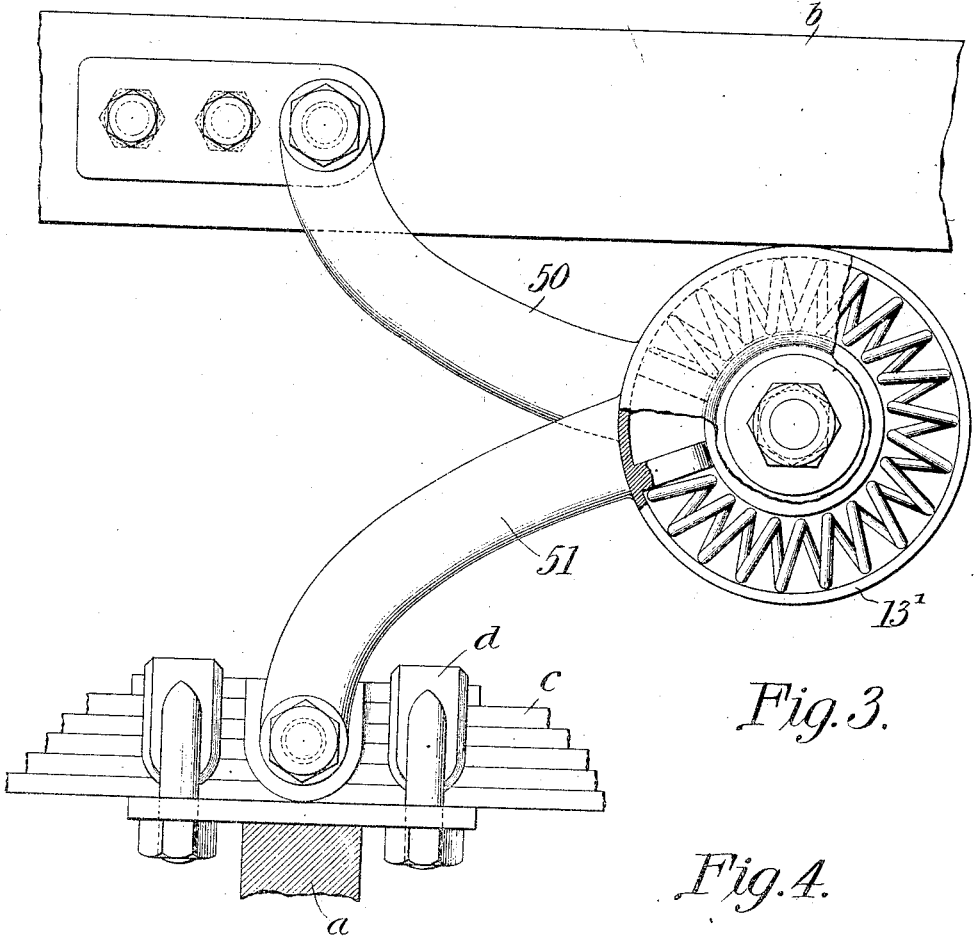
Figure 4:
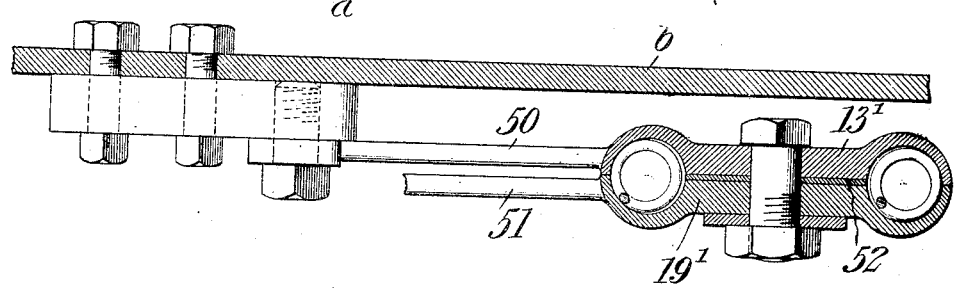

In the accompanying drawings, Figure 1 is a side elevation, partly in section, of an anti-vibration device constructed in accordance with the invention; Fig. 2 is a sectional plan view of the same; and Figs. 3 and 4 are views corresponding to Figs. 1 and 2, respectively, illustrating a modified structure embodying the invention.

The axle *a* and chassis or frame *b* may be parts of an automobile or any other wheeled vehicle. A portion of the main spring *c* and its clips *d* are also shown in order to illustrate the location of the parts.

To the vehicle body is secured a base plate 10, having a central pivot stud 11, that is provided with a threaded opening to receive a pin or bolt 12, that is threaded at both ends. On the pivot stud is mounted a disk 13, having in its outer face an annular recess 14, and from this disk extends a rocker arm 15, that is connected by a link 16 to a bracket 17, held in place by the spring clamping clips or other suitable means. The pin 12 also carries an outer disk 19, the inner face of which is provided with an annular groove 20, which mates with the groove 14 to form an annular spring-receiving chamber that is circular in cross section.

The disk 13 carries a lug 22 and the disk 19 carries a lug 23, these lugs being circular in form and extending within the spring-receiving chamber. Between the lugs is arranged a coiled compression spring 24, which tends to prevent downward swinging movement of the rocker arm 15.

The pivot stud is preferably provided with a number of openings 26 for the reception of a locking pin 27, that extends through an opening in the disk 19, so that by turning the latter the stress of the spring may be adjusted and the disk then locked to the pivot stud by the insertion of the pin. A washer 29 is employed to carry the pin and on the outer threaded end of the pin or bolt 12 are securing and jam nuts 30, the inner nut projecting somewhat over the end of the pin to prevent accidental displacement of the same.

Between the disk 13 and the base plate, is a friction washer 32, and between the disk 13 and the disk 19 is a second washer 33, the frictional resistance which these offer to the turning movement of the disk 13 being determined by the extent to which the nuts 30 are tightened.

In devices of this class as ordinarily constructed, the attempts to prevent undue vibration have usually resulted in so materially increasing or adding to the resistance of the body-supporting springs that the resiliency of the latter is reduced, this occurring principally from offering the same resistance to movement of the springs in both directions.

When traveling over an uneven road, it is not the downward movement of the vehicle body which is objectionable, but the rebound. The ordinary springs can in most instances, take care of the former, but if placed under stress from excessive compression the rebound and upward movement is difficult to check.

In the present structure, it will be seen that during downward movement from a normal position of rest the friction devices will offer uniform resistance throughout the entire movement, the spring 24 remaining inactive. On the upward movement or rebound, the friction devices offer uniform resistance during the entire movement, but the spring, being gradually compressed in case of rebound to a point above the normal position of rest, offers gradually increasing resistance, with the result that the rebound is effectually checked.

It has been found in practical use, that the springs used, while sometimes in length sufficient to nearly touch end to end before being placed in position, would not exercise any appreciable downward pressure, owing to the frictional resistance of the fiber washer 32. The better practice however, is to employ a spring of sufficient stiffness so that the opening between the ends will be sufficient to admit the spring when the absorber is in normal position. In either case when the chassis b moves downward, there is no appreciable effect due to the expansion of the spring, and when the chassis is moving downward from a normal position, the spring is not effective.

In the modified structure shown in Figs. 3 and 4, the disk 13' is carried by an arm 50, pivoted to the vehicle body, while the disk 19' is carried by an arm 51, pivoted to the spring clip or other axle connection. In this instance, a single friction plate or washer 52 is employed between two disks, but the operation is the same as already described.

Having thus described my invention, what I claim as new and desire to secure by Letters Patent, is:—

1. A vehicle body and running gear, a frictional support connecting them and sustaining the body and offering uniform resistance to movement in both directions, and an auxiliary means carried thereby and offering resistance to upward movement of said vehicle body from a normal position of rest; substantially as described.

2. A vehicle body and running gear, in combination with a frictional support connecting them and offering uniform resistance to movement in both directions, and an auxiliary means carried thereby and offering gradually increasing resistance to upward movement of the vehicle body from a normal position of rest; substantially as described.

3. A vehicle body and running gear, in combination with a sectional support between them, a frictional connection between the sections and tending to prevent upward movement of the vehicle body, and an auxiliary means carried by said support and offering resistance to upward movement of the vehicle body; substantially as described.

4. A vehicle body and running gear, in combination with a sectional support between them, a frictional connection between the sections, and tending to prevent upward movement of the vehicle body, and an auxiliary means carried by said support and offering gradually increasing resistance to upward movement of the vehicle body from a normal position of rest; substantially as described.

5. An anti-vibration device for vehicles, comprising a sectional spring-receiving casing, a spring arranged in said casing, the spring being inert during downward movement of the vehicle body from a normal position of rest, and a friction means tending to hold the sections of the casing from relative movement.

6. An anti-vibration device for vehicles, comprising a sectional spring-receiving casing, a spring arranged therein and tending to resist upward movement of the vehicle body from a normal position, said spring being substantially inert during downward movement of said body from normal position, and a friction means tending to prevent movement of the casing members in both directions.

7. In a device of the class described, a pair of relatively movable disks having mating grooves forming a spring-receiving chamber, a spring therein, and a lug carried by each disk and forming end rests for the spring; substantially as described.

8. In a device of the class described, a sectional spring-receiving casing, a spring arranged therein and tending to prevent relative movement of the casing members in one direction, a friction washer between said members, and means for forcing the members and washers into frictional contact; substantially as described.

9. In a device of the class described, a base plate secured to the vehicle body and having a pivot stud, a disk mounted on the stud and having an annular groove in its outer face, a rocker arm projecting from the disk, a link connecting the rocker arm to the running gear, a threaded pin carried by the stud, a second disk mounted on the pin and having an annular groove in its face, lugs carried by the disks and projecting into the grooves, a compression spring extending between the lugs, friction washers arranged between the base plate, the pivot stud, and the disks, and nuts on said threaded pin for forcing the parts into frictional contact; substantially as described.

In testimony whereof I affix by signature, in presence of two witnesses.

CHARLES HOLLISTER NEWTON.

Witnesses:
D. HILDRETH,
E. J. MILLS.